US008780908B2

(12) United States Patent
Mentze et al.

(10) Patent No.: US 8,780,908 B2
(45) Date of Patent: Jul. 15, 2014

(54) METHOD AND APPARATUS FOR TRACING A MULTICAST FLOW

(75) Inventors: Duane Mentze, Roseville, CA (US); Heather Giovanni, Carmichael, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 148 days.

(21) Appl. No.: 13/386,973

(22) PCT Filed: Oct. 28, 2009

(86) PCT No.: PCT/US2009/062442
§ 371 (c)(1),
(2), (4) Date: Jan. 25, 2012

(87) PCT Pub. No.: WO2011/053290
PCT Pub. Date: May 5, 2011

(65) Prior Publication Data
US 2012/0120954 A1      May 17, 2012

(51) Int. Cl.
*H04L 12/26* (2006.01)

(52) U.S. Cl.
USPC .......................................................... 370/390

(58) Field of Classification Search
USPC ........... 370/390, 242, 248, 254; 709/227, 238
See application file for complete search history.

(56) References Cited

U.S. PATENT DOCUMENTS

| 7,016,351 | B1 | 3/2006 | Farinacci et al. | |
| 7,149,794 | B1 * | 12/2006 | Attili et al. | 709/223 |
| 7,194,549 | B1 | 3/2007 | Lee et al. | |
| 7,356,578 | B1 * | 4/2008 | Eatough | 709/223 |
| 7,715,329 | B1 * | 5/2010 | Breslau et al. | 370/255 |
| 2002/0143905 | A1 * | 10/2002 | Govindarajan et al. | 709/220 |
| 2003/0135644 | A1 * | 7/2003 | Barrett | 709/238 |
| 2006/0203819 | A1 * | 9/2006 | Farinacci et al. | 370/390 |
| 2006/0239289 | A1 * | 10/2006 | Zheng et al. | 370/432 |
| 2007/0025258 | A1 * | 2/2007 | Chen | 370/241 |
| 2007/0025277 | A1 * | 2/2007 | Sajassi et al. | 370/256 |

FOREIGN PATENT DOCUMENTS

WO    WO 2006037362 A1 *  4/2006

OTHER PUBLICATIONS

IPRP, PCT/US2009/062442, May 10, 2012.
PCT Search Report/Written Opinion dated Jun. 30, 2010 ~ International Application No. PCT/US2009/062442 ~ Filing Date ~ Oct. 28, 2009.

* cited by examiner

*Primary Examiner* — Andrew Chriss
*Assistant Examiner* — Jose Perez

(57) ABSTRACT

A method for tracing a multicast flow in a network is described herein. The network may include one or more hosts and a plurality of network devices. An initiating device of the plurality of network devices receives a message to trace a multicast flow. The message includes an identification of a multicast flow. It is determined whether a multicast distribution tree of the initiating device includes state information of the multicast flow. An upstream neighbor of the initiating device is determined. A multicast trace route request is transmitted to a receiving device of the plurality of network devices. The receiving device is the upstream neighbor of the initiating device. It is determined whether a response is received from the receiving device and based on the response, it is determined whether to transmit a multicast trace route request to an upstream neighbor of the receiving device.

20 Claims, 5 Drawing Sheets

METHOD AND APPARATUS FOR TRACING A MULTICAST FLOW

CROSS-REFERENCE TO RELATED APPLICATION

This application is a national stage application under 35 U.S.C. §371 of PCT/US2009/062442, filed Oct. 28, 2009.

I. BACKGROUND

Multicasting is a method for simultaneously delivering data over a network from one or more data sources to a number of data receivers. Multicasting systems employ routing protocols to link the data sources to the appropriate data receivers in an efficient manner.

Multicasting networks are provided by multicast enabled nodes within or connected to an existing network. The nodes comprise multicast sources, multicast receivers and multicast routers. The multicast sources are the source of the multicast data that is carried via the network to the multicast receivers. The multicast routers are arranged to route the multicast data packets across the network between the multicast sources and receivers.

Two tasks are performed for the implementation of a multicast network. Firstly, the membership of a set of receivers needs to be managed. This group management may be performed manually by network administrators. Alternatively, a multicasting group management protocol may be implemented on network nodes that connect receivers, to enable the automatic management of the joining receivers to a multicast group. An example of a group management protocol is the Internet Group Management Protocol (IGMP).

Secondly, the routing of the multicast data over the network is managed. Such routing may be configured manually by network administrators. Alternatively, a multicasting routing protocol may be implemented on each node in the network to enable the automatic creation of multicast distribution trees, such as a tree information base (TIB), between the multicast sources and receivers. Examples of such routing protocols include Protocol Independent Multicast (PIM) protocols. The IGMP and PIM protocols are implemented generally in accordance with standards defined by the Internet Engineering Task Force (IETF).

One of the difficulties of debugging multicast traffic is determining the health of a multicast flow. Reports of issues in the network are typically receiver-driven whereas the fault itself can be at a considerable distance from where the symptoms are felt.

II. BRIEF DESCRIPTION OF THE DRAWINGS

The present disclosure may be better understood and its numerous features and advantages made apparent to those skilled in the art by referencing the accompanying drawings.

III. DETAILED DESCRIPTION OF THE INVENTION

Many methodologies are used today to troubleshoot multicast networks. For example, debug commands such as unicast routing and multicast routing state may be used on routers to evaluate the health of multicast routers. Typically, a network administrator moves manually from router to router at each point to evaluate a multicast distribution tree state on each router to determine a fault location.

A multicast trace route methodology is described herein which troubleshoots the multicast distribution tree, such as a tree information base (TIB), and isolates the last working point therein. In particular, it is determined whether a multicast flow is working to a particular reception point in the network. Where a fault is found, the last working point in the multicast distribution tree is identified. The identified last working point can be used to determine the location of the fault. In one embodiment, the methods as described herein are implemented on multicast routers, without requiring specialized software on sources or multicast receivers.

A method for tracing a multicast flow in a network is described herein. The network may include one or more hosts and a plurality of network devices. An initiating device of the plurality of network devices receives a message to trace a multicast flow. The message includes an identification of a multicast flow. It is determined whether a multicast distribution tree of the initiating device includes state information of the multicast flow. An upstream neighbor of the initiating device is determined. A multicast trace route request is transmitted to a receiving device of the plurality of network devices. The receiving device is the upstream neighbor of the initiating device. It is determined whether a response is received from the receiving device and based on the response, it is determined whether to transmit a multicast trace route request to an upstream neighbor of the receiving device.

In one embodiment, a system for tracing a multicast flow in a network is described herein. The system includes a processor and a memory coupled to the processor. The processor is configured to receive a message to trace a multicast flow, determine whether a multicast distribution tree of the initiating device includes state information of the multicast flow, determine an upstream neighbor of the initiating device, transmit a multicast trace route request to a receiving device of the plurality of network devices, wherein the receiving device is the upstream neighbor of the initiating device, determine whether a response is received from the receiving device, and based on the response, determine whether to transmit by the initiating device a multicast trace route request to an upstream neighbor of the receiving device.

Figure 1:
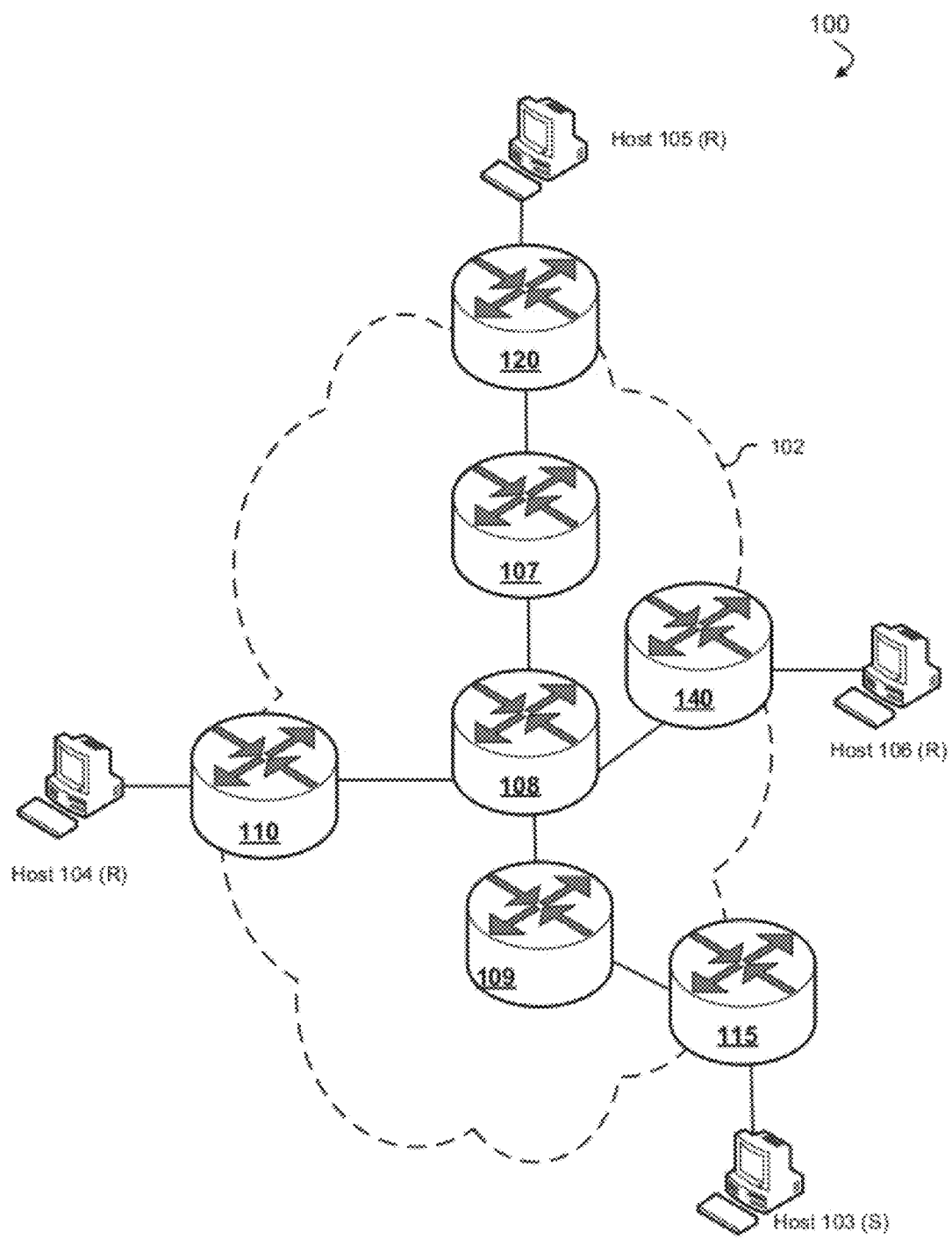
FIG. 1 is topological block diagram of a network system in accordance with an embodiment of the invention.

FIG. 1 is topological block diagram of a network 100 in accordance with an embodiment of the invention. Network 100 includes a multicast source host 103 and three multicast receivers, such as a receiver host 104, a receiver host 105, and a receiver host 106. Network 100 further includes an edge router 110, and edge router 115, and edge router 120, edge router 140, router 107, router 108, and router 109.

Multicast source host 103 is operatively coupled to edge router 115. Receiver host 104 is operatively coupled to router 110. Receiver host 105 is operatively coupled to router 120. Receiver host 106 is operatively coupled to edge router 140. Together, the multicast source host 103 and receiver hosts 104-106 comprise a multicast group.

Edge router 115 is operatively coupled to source host 103 and router 109. Edge router 110 is operatively coupled to receiver host 104 and router 108. Edge router 120 is operatively coupled to receiver host 105 and router 107. Edge router 140 is operatively coupled to receiver host 106 and router 108. Edge routers 110-140 are all edge devices on the edge of an Internet Protocol (IP) network 102. Multicasting is commonly used to distribute data over IP networks, such as IP network 102. As used herein, an edge device is a network switch, router, or other network device on the edge of a network. Host devices connect directly to the edge device via an edge port. As used herein, an edge port is a port of an edge device which is directly connected to a host device.

Router 107 is operatively coupled to edge router 120 and router 108. Router 108 is operatively coupled to router 107, edge router 110, edge router 140, and router 109.

In one embodiment, edge routers 110-140 and routers 107-109 are configured to process and transfer data in a network. Additionally, edge routers 110-140 and routers 107-109 are multicast-capable routers and may be configured to create multicast distribution trees and deliver multicast traffic to receivers which are members of a multicast group, and may be further configured to initialize a multicast trace, send, receive, and decode multicast trace route packets, and to run a multicast trace route process in various roles, such as a trace initiator and receiver. As previously described, edge routers 110-140 are coupled to hosts which are a part of a multicast group. One or more of edge routers 110-140 may include a multicast distribution tree with an entry including the source, multicast group identification, and/or next hops.

Edge routers 110-140 and routers 107-109 may operate in accordance with various protocols, such as Internet Group Management Protocol (IGMP), Protocol Independent Multicast (PIM), including PIM sparse mode (PIM-SM), PIM dense mode (PIM-DM), and bidirectional PIM (Bidir-PIM), and others.

Router 109 may be configured as a rendezvous point (RP), for example where a shared multicast distribution tree is implemented, and edge routers 110-140 may be configured as designated routers (ORs).

In operation, source host 103 may be activated to send data to the preconfigured multicast group IP address via edge router 115. In one embodiment, a multicast distribution tree may be implemented to include a source tree of a multicast flow from source host 103 to receiver hosts 104-106, denoted (S, G) where S is the IP address of the source and G is the multicast group address. In this embodiment, the root of the multicast distribution tree is source host 103.

In another embodiment, a multicast distribution tree is implemented to include shared trees of a multicast flow, denoted (*, G) where * is a wildcard notation representing all sources and G is the multicast group address. In this embodiment, router 109 may be used as a rendezvous point (RP), such that the multicast data from source host 103 is unicast from source host 103 to the RP (i.e., router 109) and multicast, via the established shared routing tree, to each of receiver hosts 104-106. The root of the multicast distribution tree is a single common root placed at a chosen network device in the network. The shared root, or RP may include router 109.

When a multicast packet is received by one or more of edge routers 110-140, the layer 3 packet headers are examined to determine the source and/or multicast group identification. Where the multicast distribution tree at the receiving router includes an entry for the multicast group, the multicast packet is forwarded by the router to the member hosts of the multicast group according to the multicast distribution tree.

A single multicast group is described herein, however, a number of additional groups may be set up over the same IP network 102. Each such additional group may use one or more of edge routers 110-140 and routers 107-109, any one of which may be designated as the RP for other multicast groups.

The present invention can also be applied in other network topologies and environments. Network 100 may be any type of network familiar to those skilled in the art that can support data communications using any of a variety of commercially-available protocols, including without limitation TCP/IP, SNA, IPX, AppleTalk, and the like. Merely by way of example, network 100 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Figure 2:
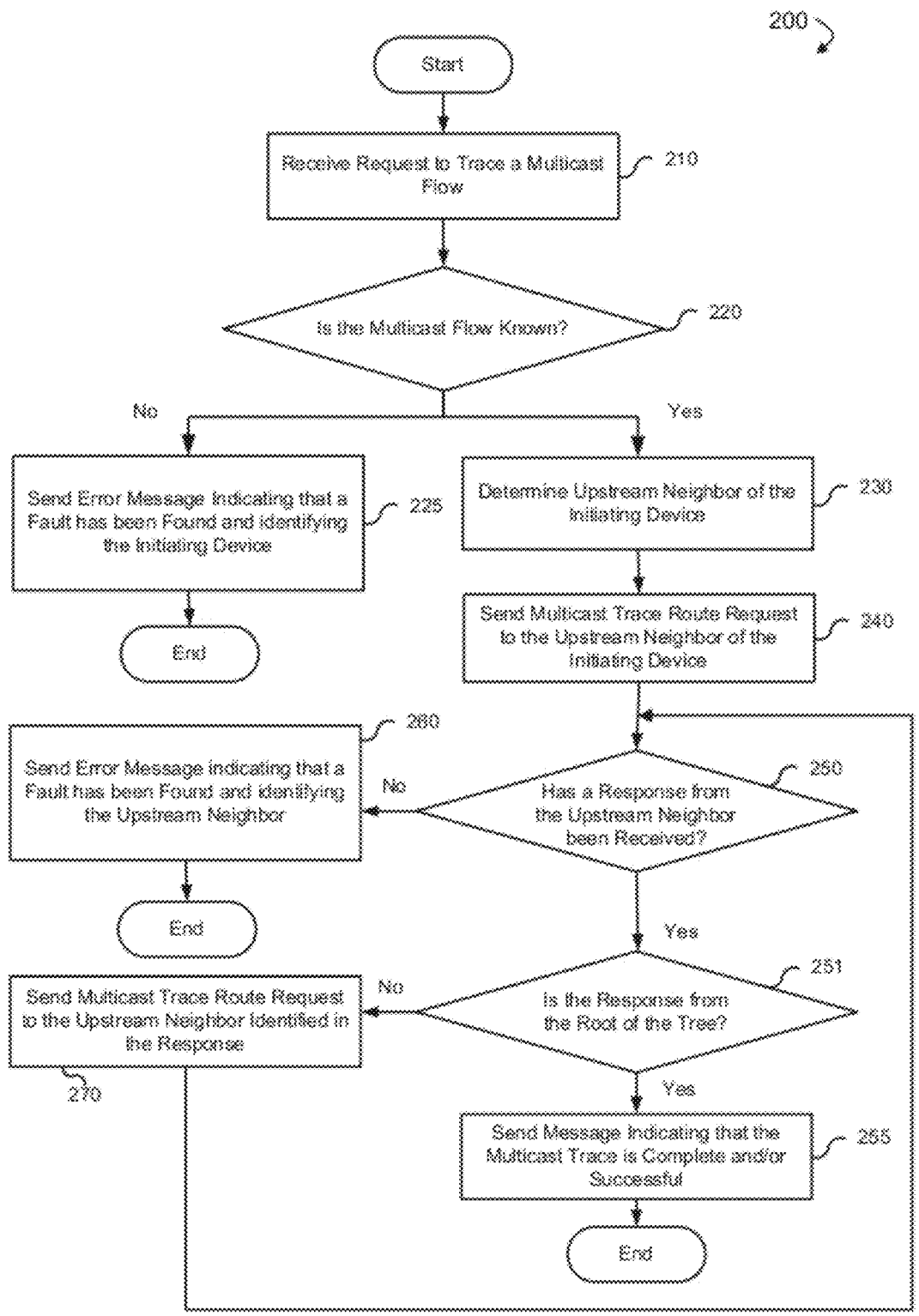
FIG. 2 is a process flow diagram for tracing a multicast flow in accordance with an embodiment of the invention.

FIG. 2 is a process flow diagram for tracing a multicast flow in accordance with an embodiment of the invention. The depicted process flow 200 is carried out by execution of one or more sequences of executable instructions. In another embodiment, the process flow 200 is carried out by execution of components of a network device, an arrangement of hardware logic, e.g., an Application-Specific Integrated Circuit (ASIC), etc.

Multicast trace route may be performed by a multicast trace route engine at a network device by troubleshooting a multicast distribution tree and identifying a fault in a multicast route in a network.

A multicast trace route is initiated, for example at a multicast router (i.e., initiating device) in the network. At step 210, a request message is received by the initiating device to trace a multicast flow. As used herein, a multicast flow is a sequence of one or more network packets sent from a multicast source. The multicast flow is identified by a unique pair of source and destination addresses in the packet. The source address is a network address of the multicast source device. The destination address is a multicast group address. In one embodiment, the initiating device is a network device in the network having a user interface by which trace requests may be received, for example, from a network administrator. The request may include a source and/or a multicast group identification. The request may further include various other parameters, such as timeout duration, a maximum number of hop counts, and a multicast destination address. The hop unt may be indicated using a time to live (TTL) field in the request. In one embodiment, a max hop counter is maintained at the initiating device and incremented upon sending a multicast trace route request to a new upstream neighbor.

The multicast trace examines in an iterative manner the route of the multicast flow in reverse, e.g., from the initiating device to the source of the multicast flow. In each iteration, the segment of the route that is examined is closer to the source of the multicast flow.

At a first iteration, the initiating device is examined for faults. At step 220, it is determined whether the multicast flow is known. In other words, it is determined whether a multicast distribution tree (e.g., TIB) includes state information of the multicast flow. For example, the initiating device may perform a look-up on its multicast distribution tree based on the source and/or multicast group identified in the received request.

Where no tree state is present in the multicast distribution tree that matches the source and/or multicast group identified in the received request, it is determined that the multicast flow is not known to the initiating device, and processing continues to step 225, where an error message is sent indicating that a fault in the network has been found and identifying the initiating device. In particular, the error message may identify that the fault could be from the initiating device, link(s) connected to the initiating device, and/or a device connected to the initiating device. The error message may be provided to, for example, the user interface of the initiating device through which the request was received at step 210. Messages that indicate that a fault is found may be used to determine the last healthy point in the multicast distribution tree and thereby isolating the failure point.

On the other hand, where a tree state is present, it is determined that the multicast flow is known, and processing continues to step 230. Since a fault is not detected at the initiating device, a segment of the route of the multicast flow that is closer to the source is examined. At step 230, the upstream neighbor of the initiating device is determined. The upstream neighbor may be determined in various ways, and may be specific to the multicast routing protocol being implemented. As used herein, the upstream neighbor for a flow for a first routing device is another routing device from which the first routing device relies upon for delivery of the flow. In an embodiment, the upstream neighbor is an immediate neighbor. For example, the upstream neighbor may be the closet neighboring routing device to the first routing device in the upstream path of the flow.

In one embodiment, if the upstream neighbor cannot be determined, the failure point may be identified at or near the initiating device. In particular, an error message may identify that the fault could be from the initiating device, link(s) connected to the initiating device, and/or a device connected to the initiating device. The error message may be provided to, for example, the user interface of the initiating device through which the request was received at step 210.

A multicast trace route request may be generated, for example by the initiating device, and transmitted or sent to the upstream neighbor of the initiating device at step 240. The request may include the same or similar parameters as the request received at step 210, such as the source of the multicast flow and/or the multicast group identification. The hop count may be set to a value of 1. As such, the receiving network device will not forward the request to any other network device in the path.

At step 250, it is determined whether a response from the upstream neighbor has been received. The response may be a multicast data packet which indicates one of the following: the trace flow is complete and/or successful, an identification of the next upstream neighbor, a fault has been found and an identification of the location of the fault in the multicast flow, and a hop count error. In one embodiment, the entity which sends the multicast trace request (e.g., the initiating device) modifies its state such that multicast traffic for multicast flow that is the subject of the request is not hardware routed. Instead, the multicast traffic may be made available for inspection such that the initiating device sees the response multicast data packet.

In one embodiment, a timeout duration may be identified in the request. As such, the initiating device may wait for a response until a counter set to the timeout duration expires. If no response is received before the expiration of the timeout counter, it may be determined that no response has been received, and processing continues to block 260. In one embodiment, if the response indicates a hop counter error, then the response may be dropped or otherwise considered as not being received.

At step 260, an error message may be sent indicating that a fault in the network has been found and identifying the upstream neighbor of the initiating device. In particular, the error message may identify that the fault could be from the upstream neighbor of the initiating device, link(s) connected to the upstream neighbor, and/or a device connected to the upstream neighbor. The error message may be provided, for example, to the user interface of the initiating device through which the request was received at step 210. The last working point in the multicast distribution tree may be determined based on the fault location. For example, the point immediately downstream in the multicast distribution tree can be identified as the last working point.

On the other hand, where a response is received at step 250 from the receiving device, processing continues to step 251. Based on the response, it is determined whether to transmit a multicast trace route request to an upstream neighbor identified in the response. In particular, at step 251, it is determined whether the response is from the root of the multicast distribution tree. In other words, it is determined whether the trace has reached the beginning of the multicast route. In one embodiment, if a designated router (DR) flag in the response is set to TRUE, the response is from the root.

At step 255, if the response was received from the root and the response indicates the trace was complete and/or successful, a message indicating that the multicast trace is complete and/or successful is sent, for example, to the user interface of the initiating device through which the request was received at step 210.

In another embodiment, if the response indicates that a fault has been found and identifies the location of the fault, an error message may be sent indicating that a fault in the network has been found and identifying the upstream device identified in the response. In particular, the error message may identify that the fault could be from the upstream device identified in the response, link(s) connected to the upstream device, and/or a device connected to the upstream device. The error message may be provided, for example, to the user interface of the initiating device through which the request was received at step 210.

If the response was not received from the root or if the response identified the next upstream neighbor, processing continues to step 270, where a multicast trace route request may be generated, for example by the initiating device, and sent to the next upstream neighbor identified in the response. As such, a response to the next upstream neighbor is transmitted based on the response received at step 250. The request may include the same or similar parameters as other requests, such as the source of the multicast flow and/or the multicast group identification. The hop count may be incremented by one. As such, the next receiving network device will not forward the request to any other network device in the path. By incrementing the hop count by one, the trace moves one multicast router closer towards the source of the multicast flow. A counter at the initiating device may track the value of the hop count. Upon sending the multicast trace route request at step 270, processing loops back to step 250. Through the iterative process, requests are sent and responses are received until the root is reached and/or a fault has been found.

Figure 3A:
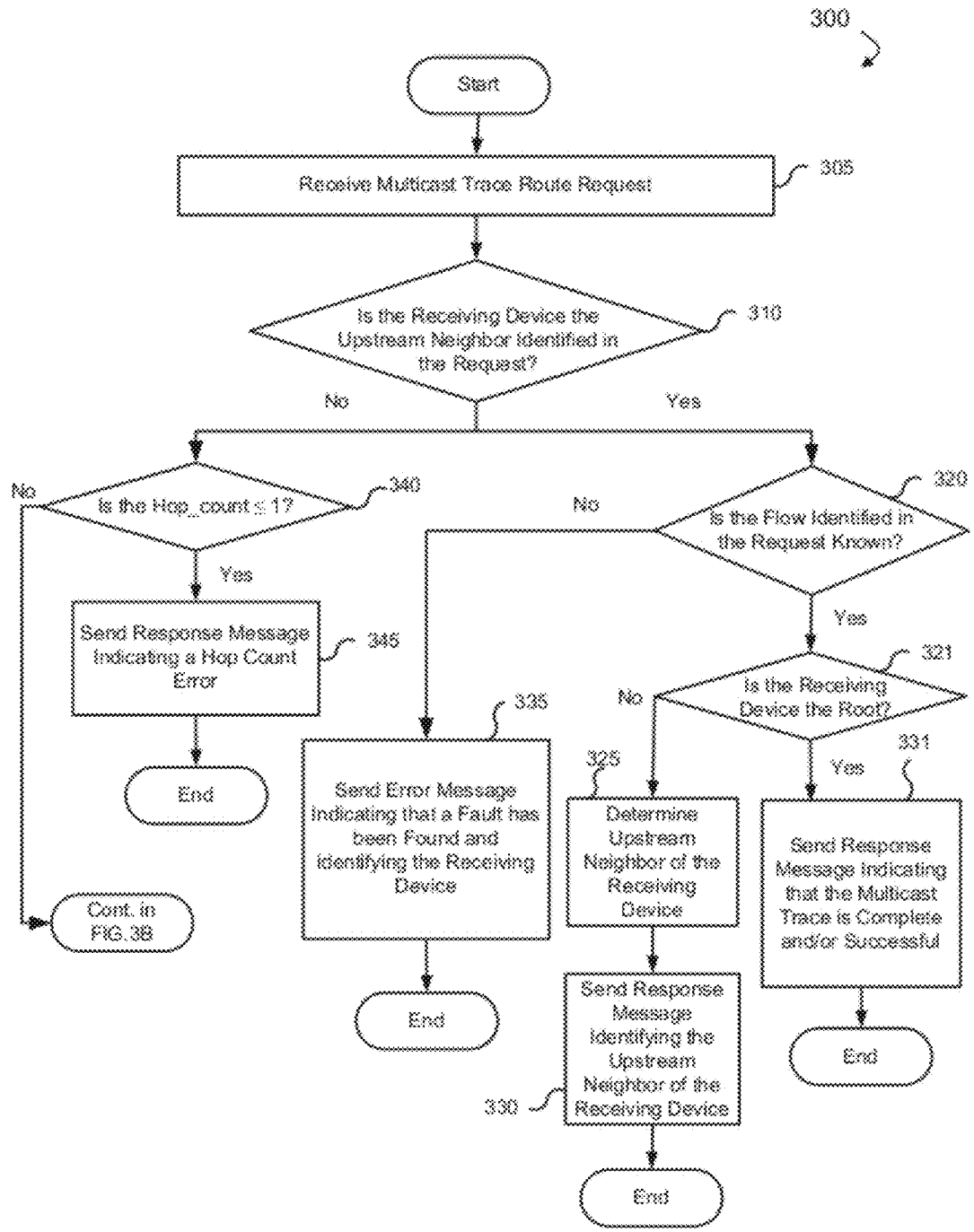
FIG. 3A is another process flow diagram for tracing a multicast flow in accordance with an embodiment of the invention.

FIG. 3A is another process flow diagram for tracing a multicast flow in accordance with an embodiment of the invention. The depicted process flow 300 is carried out by execution of one or more sequences of executable instructions. In another embodiment, the process flow 300 is carried out by execution of components of a network device, an arrangement of hardware logic, e.g., an Application-Specific Integrated Circuit (ASIC), etc.

Multicast trace route may be performed by a multicast trace route engine at a network device by troubleshooting a multicast distribution tree and identifying a fault in a multicast route in a network. The multicast trace route engine may be configured to perform one or more roles, i.e., that of a request initiator, as previously described with reference to FIG. 2, and/or that of a receiving device.

A multicast trace route is initiated, for example at step 210 of FIG. 2. At step 240 and/or step 270, a multicast trace route request is sent to an upstream neighbor of the initiating device or to the upstream neighbor identified in a response, respectively. The network device that receives the request is referred herein as a receiving device.

At step 305, the multicast trace route request is received. The request may include a source and/or a multicast group identification. The request may further include various other parameters, such as the identification of the upstream neighbor that is the intended recipient of the request, hop count, and/or an address to which a response should be sent (e.g., the address or other identification of the initiating device).

At step 310, it is determined whether the receiving device is the upstream neighbor that is the intended recipient of the request. Where the receiving device is indeed the intended recipient, processing continues to step 320, where it is determined whether the multicast flow is known. For example, the receiving device may perform a look-up on its multicast distribution tree based on the source and/or multicast group identified in the received request.

Where no tree state is present in the multicast distribution tree that matches the source and/or multicast group identified in the received request, it is determined that the multicast flow is not known to the receiving device, and processing continues to step 335, where an error message is sent indicating that a fault in the network has been found and identifying the receiving device. In particular, the error message may identify that the fault could be from the receiving device, link(s) connected to the receiving device, and/or a device connected to the receiving device. The error message may be provided to, for example, the initiating device.

On the other hand, where a matching tree state is present, it is determined that the multicast flow is known, and processing continues to step 321 where it is determined whether the receiving device is the root of the multicast distribution tree. In other words, it is determined whether the trace has reached the beginning of the multicast route.

At step 331, if the receiving device is the root, a response message indicating that the multicast trace is complete and/or successful is sent, for example, to the initiating device. The response message may be a multicast data packet. In one embodiment, if the receiving device is the last router (e.g., root) before the actual source host of the multicast flow, the response message may set a designated router (DR) flag to TRUE.

If the receiving device is not the root and since a fault is not detected at the receiving device, a segment of the route of the multicast flow that is closer to the source is examined. At step 325, the upstream neighbor of the receiving device is determined. The upstream neighbor may be determined in various ways. In one embodiment, if the upstream neighbor cannot be determined, the failure point may be identified at or near the receiving device. In particular, the error message may identify that the fault could be from the receiving device, link(s) connected to the receiving device, and/or a device connected to the receiving device. The error message may be provided to, for example, the initiating device.

A response message may be generated, for example by the receiving device, and sent to the upstream neighbor of the initiating device at step 330. The response message may be a multicast data packet which identifies the next upstream neighbor. In one embodiment, response messages may be sent down the multicast distribution tree using the source address and destination address (i.e., the multicast group identifier) provided in the request.

In the case that the receiving device is not the upstream neighbor identified in the request at step 310, processing continues to step 340, where it is determined whether the hop count value in the request is less than or equal to one. If so, at step 345, a response message indicating a hop count error is sent, for example to the initiating device. The response message may indicate the location in the network (e.g., an identification of the receiving device) where the hop limit of the request was reached. In another embodiment, if at any point the hop count is zero, and the source of the request (e.g., the initiating device) is not reached, the request is dropped. On the other hand, if the hop count is greater than one, processing continues to step 355 of FIG. 3B.

Figure 3B:
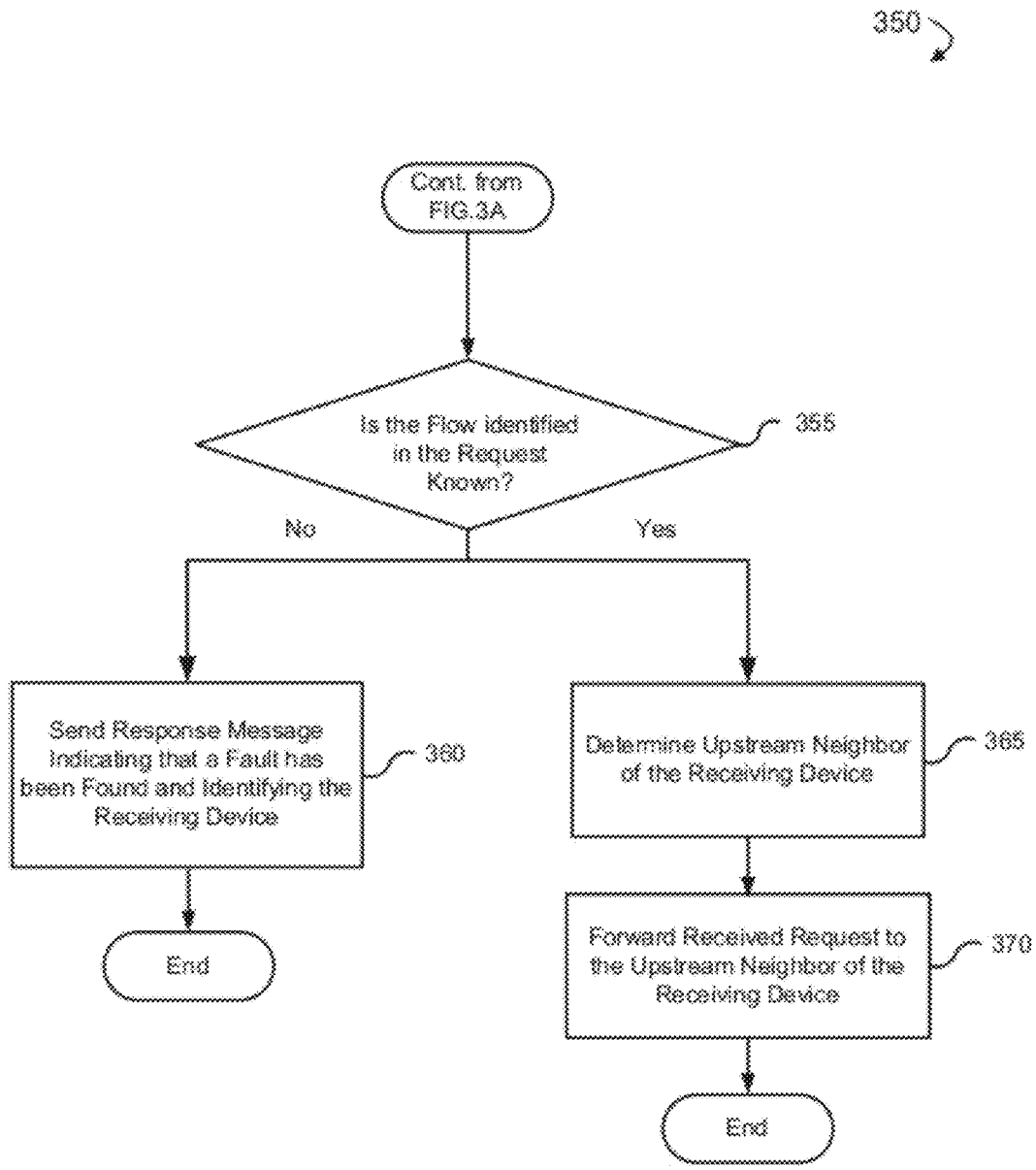
FIG. 3B is yet another process flow diagram for tracing a multicast flow in accordance with an embodiment of the invention.

FIG. 3B is yet another process flow diagram for tracing a multicast flow in accordance with an embodiment of the invention. The depicted process flow 350 is carried out by execution of one or more sequences of executable instructions. In another embodiment, the process flow 350 is carried out by execution of components of a network device, an arrangement of hardware logic, e.g., an Application-Specific Integrated Circuit (ASIC), etc.

The process flow 350 is a continuation of FIG. 3A. At step 355, it is determined whether the multicast flow is known. For example, the receiving device may perform a look-up on its multicast distribution tree based on the source and/or multicast group identified in the received request.

Where no tree state is present in the multicast distribution tree that matches the source and/or multicast group identified in the received request, it is determined that the multicast flow is not known to the receiving device, and processing continues to step 360, where a response message is sent indicating that a fault in the network has been found and identifying the receiving device. In particular, the error message may identify that the fault could be from the receiving device, link(s) connected to the receiving device, and/or a device connected to the receiving device. The response message may be provided to, for example, the initiating device.

On the other hand, where a matching tree state is present, it is determined that the multicast flow is known, and processing continues to step 365 where the upstream neighbor of the receiving device is determined. The upstream neighbor may be determined in various ways. In one embodiment, if the upstream neighbor cannot be determined, the failure point may be identified at or near the receiving device. In particular, the error message may identify that the fault could be from the receiving device, link(s) connected to the receiving device, and/or a device connected to the receiving device. The error message may be provided to, for example, the initiating device.

It should be recognized that there may be one or more intervening multicast routers between the sender of the multicast trace request and the intended recipient of the request. In one embodiment, the intervening multicast routers may forward the request upstream and decrement the hop count. At step 370, the multicast trace route request received at step 305 of FIG. 3A is forwarded to the upstream neighbor of the receiving device as determined at step 365. In one embodiment, when the request is forwarded, the receiving device decrements the hop count value in the request. When the intended recipient of the request is reached, the hop count is expected to be zero. If not, a response message indicating an error may be sent. In one embodiment, the hop count error may be indicated using multicast data packets or other packet types.

Figure 4:
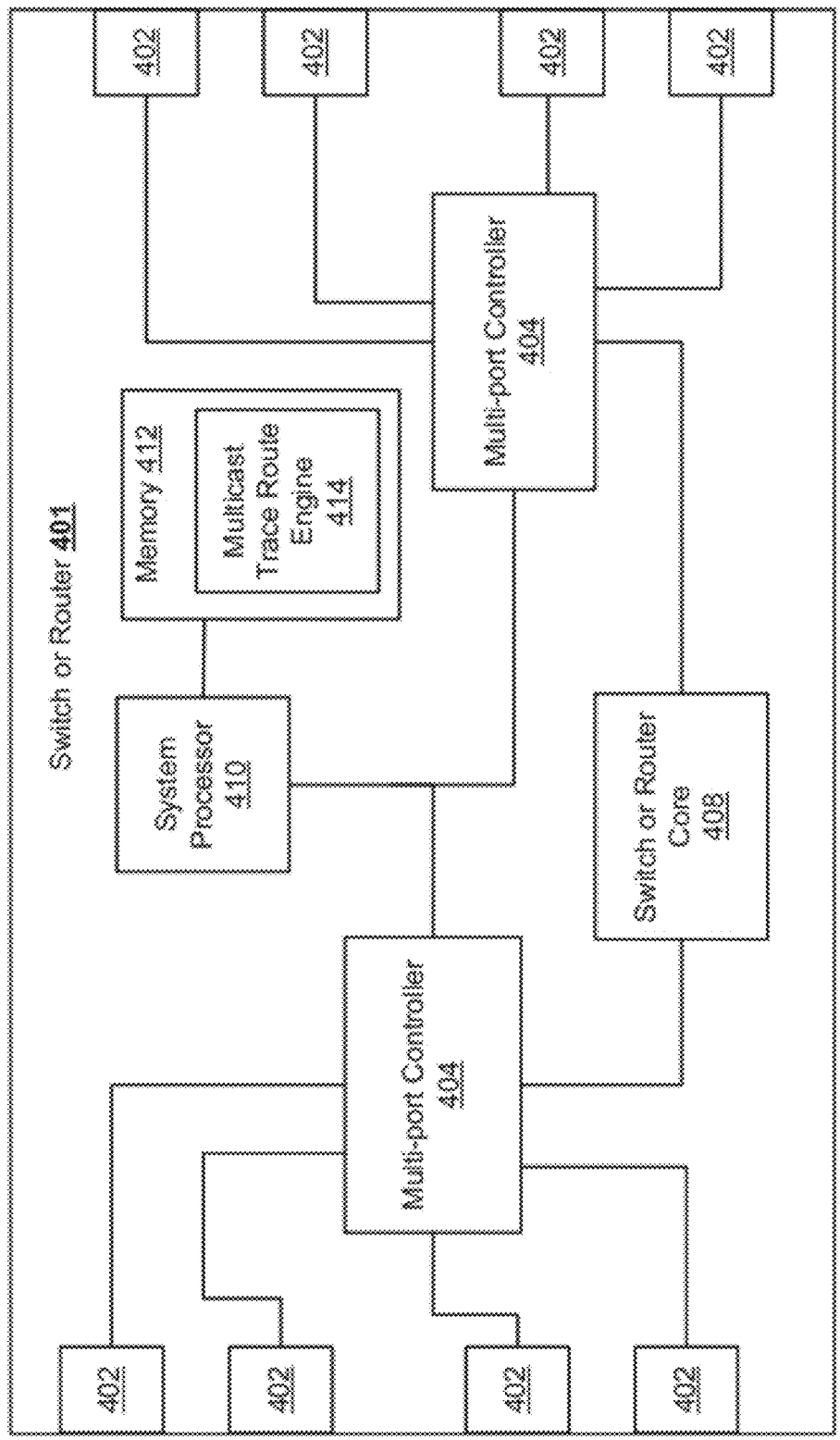
FIG. 4 is a block diagram of an exemplary switching or routing device in accordance with an embodiment of the invention.

It will be appreciated that embodiments of the present invention can be realized in the form of hardware, firmware, software or any combination thereof. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage medium that are suitable for storing a program or programs that, when executed, for example by a processor, implement embodiments of the present invention. Accordingly, embodiments provide a program comprising code for implementing a system or method as claimed in any preceding claim and a machine readable storage medium storing such a program FIG. 4 is a block diagram of an exemplary switching or routing device in accordance with an embodiment of the invention. Switching or routing device 401 may be configured with multiple ports 402. The ports 402 may be controlled by one or more controller ASICs (application specific integrated circuits) 404.

The device 401 may transfer (i.e. "switch" or "route") packets between ports by way of a conventional switch or router core 408 which interconnects the ports. A system processor 410 and memory 412 may be used to control device 401. For example, a multicast trace route engine 414 may be implemented as code in memory 412 which is being executed by the system processor 410 of device 401.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage medium that are suitable for storing a program or programs that, when executed, for example by a processor, implement embodiments of the present invention. Accordingly, embodiments provide a program comprising code for implementing a system or method as claimed in any preceding claim and a machine readable storage medium storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A method for tracing a multicast flow in a network including a plurality of network devices, the method comprising:
   receiving, by an initiating device of the plurality of network devices, a message to trace the multicast flow, the message including an identification of the multicast flow;
   in response to receiving the message, determining whether a multicast distribution tree of the initiating device includes state information of the multicast flow;
   in response to determining that the multicast distribution tree includes the state information of the multicast flow:
      determining an upstream neighbor of the initiating device;
      transmitting a multicast trace route request to a receiving device of the plurality of network devices, wherein the receiving device is the upstream neighbor of the initiating device;
      determining whether a response to the multicast trace route request is received from the receiving device; and
      based on receiving the response, determining whether to transmit by the initiating device a multicast trace route request to an upstream neighbor of the receiving device.

2. The method of claim 1, further comprising:
   incrementing a maximum hop counter, wherein the multicast trace route request to the upstream neighbor of the receiving device includes an incremented value of the incremented maximum hop counter.

3. The method of claim 1, wherein the response includes at least one of an indication that the trace of the multicast flow is complete, an identification of the upstream neighbor of the receiving device, an identification of a location of a fault in the multicast flow, and an indication of a hop count error.

4. The method of claim 1, wherein the multicast trace route request to the receiving device includes an identification of a source of the multicast flow and a timeout duration.

5. The method of claim 1, further comprising:
   receiving the response from the receiving device;
   determining whether a designated router flag in the response is set to TRUE; and
   in response to the designated router flag being set to TRUE, providing a message to a user interface of the initiating device indicating that the trace of the multicast flow is complete.

6. A non-transitory computer-readable storage medium storing instructions for tracing a multicast flow in a network including a plurality of network devices, the instructions upon execution causing a first device including a processor to:
   receive a message to trace the multicast flow, the message including an identification of the multicast flow;

in response to receiving the message, determine whether a multicast distribution tree of the first device includes state information of the multicast flow;

in response to determining that the multicast distribution tree includes the state information of the multicast flow:
determine an upstream neighbor of the initiating device;
transmit a multicast trace route request to a receiving device of the plurality of network devices, wherein the receiving device is the upstream neighbor of the initiating device;
determine whether a response to the multicast trace route request is received from the receiving device; and
based on receiving the response, determine whether to transmit by the initiating device a multicast trace route request to an upstream neighbor of the receiving device.

7. The non-transitory computer-readable storage medium of claim 6 wherein the instructions upon execution cause the first device to increment a maximum hop counter, wherein the multicast trace route request to the upstream neighbor of the receiving device includes an incremented value of the incremented maximum hop counter.

8. The non-transitory computer-readable storage medium of claim 6, wherein the response includes at least one of an indication that the trace of the multicast flow is complete, an identification of the upstream neighbor of the receiving device, an identification of a location of a fault in the multicast flow, and an indication of a hop count error.

9. The non-transitory computer-readable storage medium of claim 6, wherein the multicast trace route request to the receiving device includes an identification of a source of the multicast flow and a timeout duration.

10. The non-transitory computer-readable storage medium of claim 6 wherein the instructions upon execution cause the first device to further:
receive the response from the receiving device;
determine whether a designated router flag in the response is set to TRUE; and
in response to the designated router flag being set to TRUE, provide a message indicating that the trace of the multicast flow is complete.

11. An initiating device for tracing a multicast flow in a network including a plurality of network devices, the initiating device comprising:
a processor; and
a memory coupled to the processor;
wherein the processor is configured to:
receive a message to trace the multicast flow, the message including an identification of the multicast flow;
in response to receiving the message, determine whether a multicast distribution tree of the initiating device includes state information of the multicast flow;
in response to determining that the multicast distribution tree includes the state information of the multicast flow:
determine an upstream neighbor of the initiating device;
transmit a multicast trace route request to a receiving device of the plurality of network devices, wherein the receiving device is the upstream neighbor of the initiating device;
determine whether a response to the multicast trace route request is received from the receiving device; and
based on receiving the response, determine whether to transmit by the initiating device a multicast trace route request to an upstream neighbor of the receiving device.

12. The initiating device of claim 11, wherein the processor is further configured to increment a maximum hop counter, wherein the multicast trace route request to the upstream neighbor of the receiving device includes an incremented value of the incremented maximum hop counter.

13. The initiating device of claim 11, wherein the response includes at least one of an indication that the trace of the multicast flow is complete, an identification of the upstream neighbor of the receiving device, an identification of a location of a fault in the multicast flow, and an indication of a hop count error.

14. The initiating device of claim 11, wherein the multicast trace route request to the receiving device includes an identification of a source of the multicast flow and a timeout duration.

15. The initiating device of claim 11, wherein the processor is further configured to:
receive the response from the receiving device;
determine whether a designated router flag in the response is set to TRUE; and
in response to the designated router flag being set to TRUE, provide a message indicating that the trace of the multicast flow is complete.

16. The method of claim 1, further comprising:
in response to determining that the multicast distribution tree does not include the state information of the multicast flow, sending an error message indicating a fault in the network has occurred.

17. The method of claim 1, further comprising:
in response to not receiving the response, sending an error message indicating a fault in the network has occurred.

18. The method of claim 1, wherein determining whether to transmit the multicast trace route request to the upstream neighbor of the receiving device comprises deciding to transmit the multicast trace route request to the upstream neighbor of the receiving device in response to determining that the upstream neighbor of the receiving device is not a root of the multicast distribution tree.

19. The non-transitory computer-readable storage medium of claim 6, wherein the instructions upon execution cause the first device to further:
in response to determining that the multicast distribution tree does not include the state information of the multicast flow, send an error message indicating a fault in the network has occurred.

20. The initiating device of claim 11, wherein the processor is configured to further:
in response to determining that the multicast distribution tree does not include the state information of the multicast flow, send an error message indicating a fault in the network has occurred.

* * * * *